June 10, 1930.  J. E. WATKINS  1,763,607
COTTON HARVESTER
Filed Oct. 11, 1924   2 Sheets-Sheet 1

WITNESSES

INVENTOR
J. E. Watkins,
BY
ATTORNEYS

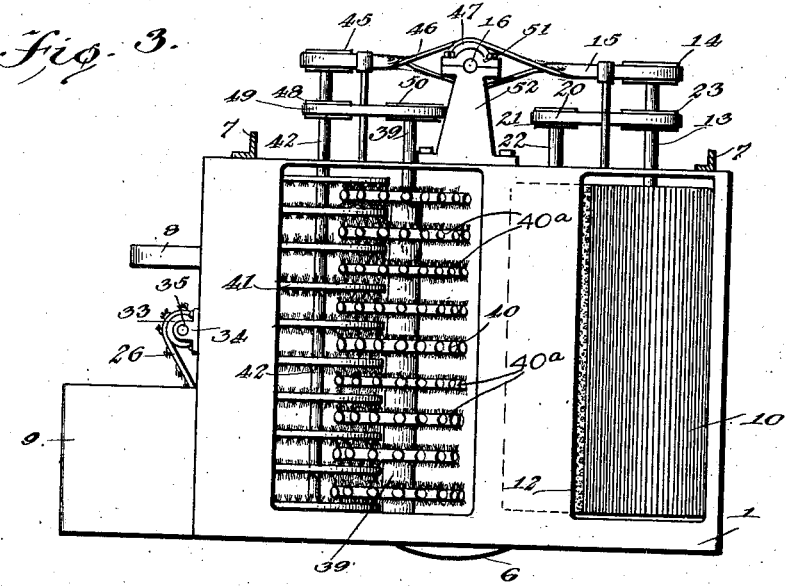
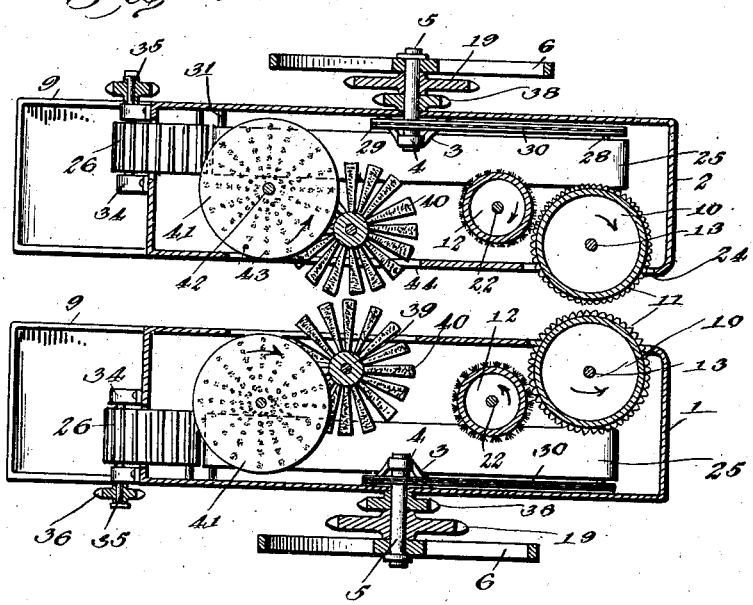

Patented June 10, 1930

1,763,607

UNITED STATES PATENT OFFICE

JULIAN EDGAR WATKINS, OF NAVASOTA, TEXAS

COTTON HARVESTER

Application filed October 11, 1924. Serial No. 743,116.

This invention relates to cotton harvesters and has for its object the provision of a device adapted to be moved between rows of cotton plants whereby the cotton is directly removed from the rows and deposited in a container.

A further object of the invention is the provision of a plurality of coordinated picker and stripper mechanisms for removing cotton directly from the bolls of the cotton plant and placing them in a predetermined manner in a container from which the cotton is adapted to be removed.

A still further object of the invention is the provision of a device for harvesting cotton and in which the cotton lint is removed directly from the bolls so that the lint when removed from the device is ready for baling and without necessitating a ginning operation at the cotton mill.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claim.

In the drawings:

Figure 3 is a vertical section of the cotton harvester, taken along the line 3—3 of Fig. 2.

Figure 4 is a horizontal section of the same, taken along the line 4—4 of Fig. 1.

Figure 1:
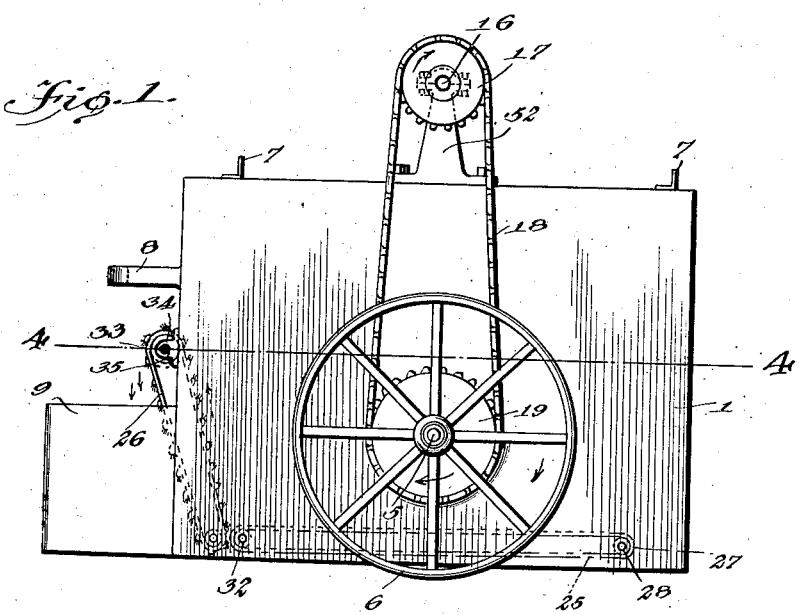
Figure 1 is a side view of the cotton harvester.
Figure 2:
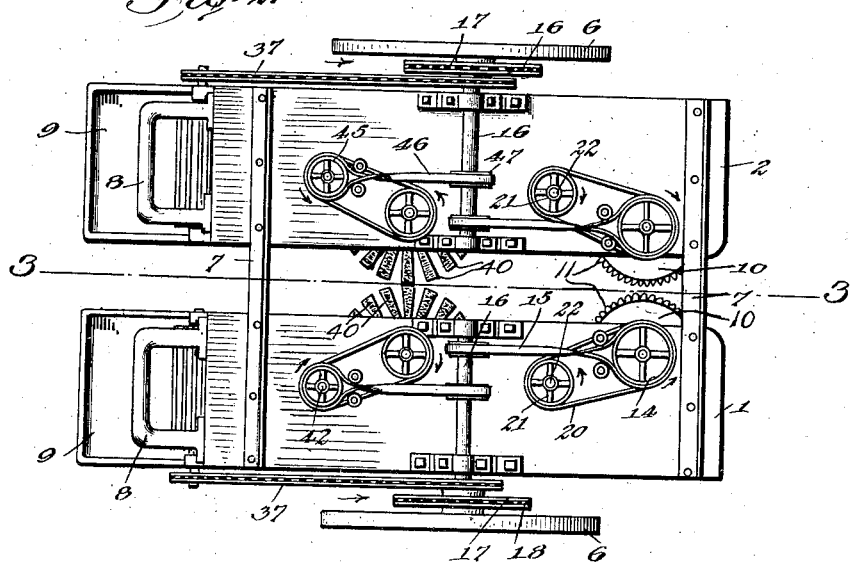
Figure 2 is a plan view of the same.

Referring more particularly to the drawings, 1 and 2 represent metal casings spaced from each other for the purpose of permitting the cotton plants to pass between the inner walls. The outer side walls of the casings are provided with brackets 3 adapted to support bearings 4 in which are mounted axles 5 of the vehicle. Supporting means 6 are rigidly connected with the axles so that when the device is carried along the rows of cotton the wheels are operated for rotating the axles 5.

The casings are rigidly connected together at their upper ends with angle irons 7. U-shaped handles 8 are secured to the rear walls of the casings and are located above the containers 9 which are adapted to receive the cotton after the same has been harvested.

Each of the forward ends of the casings 1 and 2 is provided with a picking device which consists of a hollow cylinder 10 having wire teeth 11 and a cylindrical stripping brush 12. The cylinder 10 is mounted on a shaft 13 driven by a pulley 14, belt 15 and a shaft 16. Each of the shafts 16 has a rigidly mounted sprocket wheel 17 driven by a chain 18 which in turn is driven by a sprocket wheel 19 on an axle 5.

A belt 20 drives a pulley 21 on a shaft 22 through a pulley 23 on shaft 13. The shaft 22 is rigid with the brush cylinder 12 and thereby rotates the brush cylinder in the same direction as the direction of rotation of cylinders 10. The pair of cylinders 10 project through openings 24 in the inner side wall of the casings 1 and 2 and are spaced sufficiently apart to receive the plant and remove the cotton lint without injury to the plant. The brush cylinders 12 are located within the casings and adapted to cooperate with the teeth 11 of the cylinder 10 for removing the cotton from said teeth and depositing the same upon a travelling belt 25. This belt is extended rearwardly of the casings and terminates adjacent the lower end of an elevator 26. The upper end of the elevator is located above the containers 9 where the cotton is discharged into said containers.

The travelling carrier 25 is driven through a sprocket 27 mounted on a shaft 28 which in turn is carried by the casings. On the inner ends of the axles 5 and adjacent the inner face of the outer side of the casings 1 and 2 are mounted sprockets 29 which drive a chain 30. This chain co-acts with the sprocket 27 for driving the shaft 28. A spindle 31 is mounted at the rear end of each casing upon which is rotatably mounted a drum 32. The belt carrier 25 is driven through a drum on the shaft 28 and is carried by the idling drum 32. The travelling carrier or elevator 26 is driven by a drum 33 rigid with a shaft 34, the shaft being mounted in bearings 35 secured to the rear ends of the casings 1 and 2. The shaft carries a sprocket 36 which is driven through the chain 37 and a sprocket 38 on the axle 5.

A shaft 39 is mounted in bearings in each casing and is provided with a plurality of fingers 40 arranged radially from the cylinder 39 and in the same plane. A series of these fingers located in the same plane are spaced from each other and along the vertical shaft 39. Each of the fingers is provided with brush members 40ª adapted to remove the remaining strands of cotton from the plant as these fingers are revolved between the branches and in engagement with the bolls. Between each series of horizontally and radially disposed fingers 40 is rotated a disc 41. The spaced discs 41 are secured to a vertical shaft 42 and are provided upon their opposite faces with a plurality of brushes 43 which are adapted to engage the brush members on the fingers 40 for removing the cotton from said brushes and for depositing the cotton upon the travelling carrier 25 in each casing. Along the ends of the fingers 40 are provided openings 44 in the sides of the casings 1 and 2 through which the fingers revolve. The ends of the revolving fingers of each casing are adapted to be slightly spaced from each other in order that the fingers may come in contact with all branches of the plant without injury to said plant.

As has been stated the cotton deposited by the discs 41 on the belts 25 is carried by the elevators 26 and discharged into the containers 9 at the ends of the casings 1 and 2. The shafts 42 carrying discs 41 are driven by a pulley 45 on said shaft, a belt 46 and a pulley 47 rigid with the shaft 16. A second pulley 48 drives a belt 49 which in turn drives a pulley 50 rigid with shaft 39. The shafts 16 are carried by bearings 51 formed on the upper ends of standards 52 mounted upon the top of the casings 1 and 2.

The device may be manually operated by the operator pushing the same forwardly by the handles 8 or the device may be drawn by any well known form of traction element. As the wheels are drawn along the ground the axles 5 are rotated as are shafts 16 whence the various cylinders 10, brushes 12, fingers 40 and discs 41 are revolved. As the device is pushed along a row of plants the plants travel between the casings 1 and 2 and are engaged by two cylinders 10 which remove a greater portion of the cotton from the plants. The brushes 12 strip the cotton from the teeth of the cylinders 10 and deposit it upon the travelling carrier 25. The fingers 40 revolving in the path of the plants pass through the branches at various elevations and remove the remaining cotton from the plants while the discs provided with brushes along the opposite faces revolve between the fingers 40 and remove the cotton from the brush members of the fingers and deposit the same upon the travelling belt 25. As the cotton reaches the elevator 26 it is removed and discharged into the containers 9 at each side of the casings 1 and 2.

It will be noted that all of the elements of one casing are duplicated in the other casing and all the rotatable elements revolve at the same speed and operate in a similar manner and cooperate with each other for removing the entire crop of cotton from the plants.

What I claim is:

A cotton harvester comprising a pair of spaced casings providing a path for the plants, wheels supporting the casings, a shaft rotatably mounted in each casing and provided with a plurality of spaced radial fingers projecting from the shaft and into the path between the casings, said fingers at diametrically opposite points thereof being equipped with brushes, a second shaft in each casing provided with a plurality of spaced discs having brushes on the opposite faces thereof, each of said brush-equipped fingers being adapted to pick the cotton from the branches of the plants, groups of the fingers being located in spaced horizontal planes and arranged to project between pairs of the brush equipped discs, said fingers adapted to be revolved between a pair of said discs, so that the revolving brushes will remove the lint from the brush-equipped fingers, and means operatively connecting the shafts with the wheels, whereby the shafts will be revolved when the casings are forced along a row of cotton plants.

JULIAN EDGAR WATKINS.